United States Patent [19]

Buehler et al.

[11] Patent Number: 5,275,991

[45] Date of Patent: * Jan. 4, 1994

[54] SUPPORTED HIGH ACTIVITY POLYOLEFIN CATALYST COMPONENT WITH REGULAR DISTRIBUTION OF MAGNESIUM VALUES PROVIDED UTILIZING A CONTROLLED DRYING PROTOCOL

[75] Inventors: Charles K. Buehler, Cincinnati; Albert P. Masino, Hamilton; Raghu Menon, West Chester, all of Ohio

[73] Assignee: Quantum Chemical Corporation, Cincinnati, Ohio

[ * ] Notice: The portion of the term of this patent subsequent to Jun. 22, 2018 has been disclaimed.

[21] Appl. No.: 984,052

[22] Filed: Nov. 30, 1992

Related U.S. Application Data

[63] Continuation-in-part of Ser. No. 854,199, Mar. 20, 1992, Pat. No. 5,221,650, which is a continuation-in-part of Ser. No. 590,992, Oct. 1, 1990, Pat. No. 5,143,833, which is a continuation of Ser. No. 435,495, Jul. 11, 1989, abandoned, which is a continuation-in-part of Ser. No. 99,190, Sep. 21, 1987, abandoned, and a continuation-in-part of Ser. No. 717,956, Jun. 20, 1991, Pat. No. 5,145,821, which is a continuation-in-part of Ser. No. 521,302, May 9, 1990, Pat. No. 5,034,365.

[51] Int. Cl.$^5$ .............................................. C08F 4/654
[52] U.S. Cl. ............................... 502/107; 502/104; 502/111; 502/112; 502/103; 502/120; 502/125; 526/124
[58] Field of Search ................ 502/104, 107, 111, 112, 502/103, 120, 125

[56] References Cited

U.S. PATENT DOCUMENTS

| | | |
|---|---|---|
| 4,210,736 | 7/1980 | Baekelmans et al. |
| 4,530,913 | 7/1985 | Pullukat et al. |
| 4,565,795 | 1/1986 | Short et al. |
| 4,593,079 | 6/1986 | Rekers et al. |
| 4,668,650 | 5/1987 | Lo et al. |
| 4,677,087 | 6/1987 | Lo et al. |
| 4,686,199 | 8/1987 | Tachikawa et al. |
| 4,855,271 | 8/1989 | McDaniel et al. |
| 4,950,631 | 8/1990 | Buehler et al. |
| 5,034,365 | 7/1991 | Buehler et al. ............... 502/120 X |
| 5,037,789 | 8/1991 | Buehler et al. |
| 5,126,302 | 6/1992 | Masino. |
| 5,143,883 | 9/1992 | Buehler et al. ............... 502/120 X |
| 5,145,821 | 9/1992 | Buehler et al. ............... 502/120 X |

*Primary Examiner*—Patrick P. Garvin
*Attorney, Agent, or Firm*—Kenneth D. Tremain

[57] ABSTRACT

A novel catalyst support and a method for preparation thereof, characterized by the presence of selected amounts of a hydrocarbon soluble magnesium-containing compound applied to the support relative to solvent, wherein a surface uniformly and essentially continuously moistened with the solvated magnesium compound in a condition of incipient precipitation to permit the formation of a regular essentially continuous distribution of the magnesium compound onto and conforming to the support material. The drying process under these conditions is effective in maintaining to a high degree the effective surface area and pore volume of the material. The support containing the adsorbed magnesium is then dried in a controlled manner to essential incipient wetness conditions providing a regular spatial distribution of stacked reticular magnesium values at a level of one to five molecular monolayers on the support.

A representative process for polymerizing or copolymerizing olefins providing stereospecific polymers such as propylene is disclosed.

24 Claims, No Drawings

SUPPORTED HIGH ACTIVITY POLYOLEFIN CATALYST COMPONENT WITH REGULAR DISTRIBUTION OF MAGNESIUM VALUES PROVIDED UTILIZING A CONTROLLED DRYING PROTOCOL

CROSS-REFERENCE TO RELATED APPLICATIONS

This application is a continuation-in-part of U.S. Ser. No. 854,199, filed Mar. 20, 1992 (now U.S. Pat. No. 5,221,650), which in turn is a continuation-in-part of U.S. Ser. No. 590,992 filed Oct. 1, 1990 and now U.S. Pat. No. 5,143,833, which is a Rule 60 Continuation of U.S. Ser. No. 435,495 filed Jul. 11, 1989 (now abandoned) which is a continuation-in-part of U.S. Ser. No. 099,190 filed Sep. 21, 1987 (now abandoned); and a continuation-in-part of U.S. Ser. No. 717,956 filed Jun. 20, 1991 and now U.S. Pat. No. 5,145,821 which is a continuation-in-part of U.S. Ser. No. 521,302 filed May 9, 1990 (now U.S. Pat. No. 5,034,365).

FIELD OF THE INVENTION

The present invention relates to a high activity supported catalyst useful in the production of polyolefins, particularly polypropylene of relatively high powder bulk density, narrow particle size distribution and high isotacticity. More specifically, the present invention relates to the production of a catalyst component not requiring an added internal electron donor, useful in the polymerization of propylene to stereoregular olefin polymers, wherein a silica support is treated with magnesium and titanium compounds. The catalyst prepared by the present invention is characterized in manufacture by the presence of an amount of solvent for a hydrocarbon soluble magnesium-containing compound applied to the inorganic carrier sufficient to provide effective wetting of the surface area with said compound such that a regular essentially continuous distribution of accessible magnesium values is present on the support material for further reaction. Control over the distribution of the magnesium constituent believed without limitation to be essentially physisorbed is achieved through application of the magnesium containing compound to the support as a solution in a hydrocarbon solvent in a condition of near saturation under ambient conditions, and drying at elevated temperatures for a time sufficient to concentrate to a selected level, a proportion of the hydrocarbon solvent associated with the applied magnesium compound.

BACKGROUND OF THE PRIOR ART

Olefin polymerization using Ziegler-Natta type catalysts has been widely utilized in industry. These catalysts provide polyolefins in high yield possessing the desired physical characteristics of these polymers. However, the use of Ziegler-Natta catalysts do suffer some serious limitations. Thus, new and improved catalysts are continually being sought and developed. An important class of catalysts where improvement is sought is for the polymerization of the very commercially important alphaolefin, propylene.

Commonly in the polymerization of propylene a catalyst containing a magnesium halide support is utilized. However, when propylene is polymerized from such a supported catalyst, the polypropylene molding machine processing this polymer is subjected to extensive corrosion, or other damage, directly caused by the presence of residual halide in the polypropylene product. More importantly, the polypropylene molded article processed in this manner is characterized by aesthetic flaws.

Another serious drawback of art recognized catalysts, in the polymerization of propylene polymers, involves the required use of internal electron donors to insure that the propylene polymer product is highly isotactic. However, unless the amount and type of electron donor compound is carefully selected, not only is the stereoregularity of the resultant polymer deficient but poor catalytic activity often results. This detrimental effect will still occur even if the catalyst is formed with the roper electron donor compound added in the wrong sequence.

The utilization of electron donor compounds often creates additional problems involving the evolution of offensive odors in the final polymeric product. This offensive odor will also be present even if the ideal electron donor compound, in the correct concentration, added at the proper time in the catalyst formation process, is utilized. Thus, polymers formed from these catalysts which include an electron donor compound must oftentimes be deashed or deodorized in order to insure that the final product does not give off any offensive odors.

These difficulties discussed herein has lead workers skilled in the art to produce and develop new catalysts which are aimed to overcome these difficulties.

Drying of catalyst components, especially catalytic supports, is common in the industry. For the supports alone, calcining which implies heating under a nitrogen atmosphere is typically employed to control the presence of adsorbed moisture with these hygroscopic materials, at least in part to avoid hydrolytic reactions with other catalyst reactants. Moisture present in the support is widely recognized as one of several substances which may act as catalyst poisons. For these very reasons, however, such drying is carried out under stringent conditions to essential dryness. See e.g. U.S. Pat. No. 4,593,079.

Short et al. U.S. Pat. No. 4,565,795 discloses an olefin polymerization catalyst which is prepared by the reaction of a chemically treated silica support with a dihydrocarbyl magnesium compound and a halogenated tetravalent titanium compound The solvent for the dihydrocarbyl magnesium compound was removed by evaporation.

U.S. Pat. No. 4,530,913 of Pullukat et al. discloses a method of preparing a solid polymerization catalyst component by reacting a modified support with an organomagnesium compound and a tetravalent titanLum compound with no intermediate drying step. The solvent was subsequently evaporated.

Tachikawa et al. U.S. Pat. No. 4,686,199 describes a catalyst component formed from the reaction of a metal oxide with one or more non-halogenated magnesium alkoxide, a halogen-containing compound, and a titanium compound. Excess inert solvent associated with the magnesium compound is removed in Example 1 under nitrogen by vaporization, and after contact with another magnesium compound the solid was dried in vacuo at 90° C. for 2 hours.

McDaniel et al. U.S. Pat. No. 4,855,271 describes a catalyst component prepared by contacting a support comprising highly porous alumina containing a magnesium compound with an alcohol and subsequently with a halide, alkoxide, or haloalkoxide of titanium and/or vanadium. Once the magnesium compound is impregnated onto the alumina support under the conditions of incipient wetness, drying conditions are selected so as to minimize reduction in the porosity of the support. Typically, this involves heating at a temperature of about 30° C. to about 800° C. More preferably, the drying temperature is from about 100° C. to about 400° C.

By way of background to the invention, U.S. Pat. No. 4,950,631 including inventor Buehler discloses a process for propylene polymerization using a modified silica based catalyst. The catalyst is prepared by first pretreating the silica support either by calcination or chemical treatment with a disilazane compound followed by modifying the silica by reacting it with a hydrocarbon soluble magnesium compound. In this case, the solid product was allowed to settle and the supernatant siphoned off. This modified support is then made chemically active by reacting with a titanium compound having the formula, $Ti(OR)_nX_m$, wherein R is an aryl, alkyl or any mixtures thereof containing $C_1$-$C_{28}$ atoms, X is a halogen, $n=1$ to 4 and $m=0$ or 1 to 3 such that $n+m=4$. This catalyst precursor is then reacted with another titanium compound having the formula $TiX'_p(OR')_q$ where X' is a halogen, R' is an aryl or alkyl group, $p=1$ to 4; and $q=0$ or 1 to 3 such that the sum of p and q equals 4. The final catalyst was dried by evaporation to a free flowing solid. Additionally, cocatalyst containing an aluminum compound and/or a silane compound can be used.

The significance of the drying and washing steps in relation to solvents in these catalysts became increasingly apparent to the present inventor(s), such that in copending and commonly assigned U.S. Ser. No. 590,992 of Buehler, Fries and Pullukat filed Oct. 10, 1990 incorporated herein by reference, a "minimum level" of solvent for the magnesium compound is mentioned This application also observes at page 23, lines 28-33 that underdrying or overdrying may be deleterious and expresses preference for drying after reaction with the magnesium compound at 70-80° C. for 1½ to 2½ hrs. Then, in copending and commonly assigned U.S. Ser. No. 717,956 of Buehler and Masino filed Jun. 20, 1991 incorporated herein by reference, a drying step is disclosed in Example 19 to remove 67% by weight of the solvent from the magnesium compound.

It has been surprisingly discovered upon further consideration and elucidation of the parametric preparative conditions that drying to a selected solvent level, as it controls the nature of micro-deposition in and upon the surface of relatively high surface area, high pore volume inorganic supports, with applied hydrocarbon soluble magnesium compounds is a key variable in providing desired catalyst characteristics and in turn improved polymer properties in preparation and use. In accordance with the invention, simplified preparation of highly active propylene polymerization catalysts is afforded without internal electron donors, magnesium halide supports, or multiple reactants.

SUMMARY OF THE INVENTION

The present invention is related to a catalytic precursor and the catalyst for one or more olefins providing products such as ethylene, propylene, butene-1, 3-methylbutene-1, 4-methyl pentene-1 and the like which, when employed in polymerization reactions, produce homopolymers and copolymers including terpolymers e.g. with hexene-1 and butene-1. Furthermore, the olefin polymer produced by using the present catalyst is characterized by uniform particle size distribution, high melt index, and high bulk density. These characteristics generally enhance the production rate and processability of the polymer. In addition, the catalyst is itself highly active, resulting in high polymer productivity. Its performance in use is a reflection of a high level of retained surface area and pore volume in the finished catalyst, as demonstrated hereinafter.

The catalyst of the present invention is also characterized by safe and easy preparation methods. Unlike magnesium halide support catalysts, described previously herein, expensive ballmilling is not required by the present catalyst. Also, other expensive prepolymerization steps which are usually required of magnesium halide supported catalysts are not necessary. The polymer produced has a low halogen content, significantly reducing the problems of corrosion oftentimes associated in the processing of such polymers. Moreover, because the catalyst retains low residual metal content, no deashing of the polymer product is required. Finally, the polymerization reaction using the present catalyst is enhanced due to its relative constant activity over long periods of time. Additionally, the catalyst of the present invention allows for easy control of polymer molecular weight with the judicious addition of hydrogen.

The catalyst of the present invention is prepared by first interacting a silica support with a hydrocarbon solubilized magnesium containing compound and drying the resultant slurry under precisely defined conditions so as to effect a regular essentially uniform deposition of the magnesium compound onto and conforming to the surface of the silica.

This catalytic precursor can then be optionally treated with a modifying compound having the structural formula $EX_n$, where E is C, Si, P, B, or S; $X=Cl$, Br, F, I, or mixtures thereof; and n is an integer of 1 to 4. Most preferably silicon tetrachloride is utilized in an amount which can be related to the removal of alcohol present in the solvated magnesium containing reactant.

The resultant solid is then contacted with an excess amount of titanium-containing compound having the structural formula $TiX_nY_{4-n}$ where $X=Cl$, Br, I; $Y=F,R$, OR or $NR_2$ wherein $R=C_1$ to $C_{12}$ hydrocarbyl; and n is 0 or an integer from 1 to 4.

The key aspects of the present invention involve the provision of a novel catalyst support and a method for preparation thereof, characterized by the presence of selected amounts of a hydrocarbon soluble magnesium-containing compound applied to the support relative to solvent, wherein a surface uniformly and essentially continuously moistened with the solvated magnesium compound is achieved in a condition of incipient precipitation to permit the formation of a regular essentially continuous distribution of the magnesium containing compound onto and conforming to the support material. The drying process under these conditions is effective in maintaining to a high degree the effective surface area and pore volume of the material. The support containing the adsorbed magnesium is then dried in a controlled manner to essentially incipient wetness conditions. It is believed without limitation that the drying process employed herein provides a regular spatial distribution of stacked reticular magnesium values which corresponds to a level of about one to about five molecular monolayers on the support.

The use of the solvated magnesium compound in a state of near precipitation provides an adherable but workable composition which can provide a surface of the support that is essentially uniformly wetted with solvent; the drying step concentrates that solution while maintaining the uniform distributive nature of the original solution, leading to a regular spatial arrangement of magnesium values on the support for interaction with other catalyst components.

In another aspect of the present invention, a representative process for polymerizing or copolymerizing olefins providing stereospecific polymers such as propylene is disclosed. In this process, propylene is polymerized under propylene polymerization conditions where applicable in concert with one or more monomers copolymerizable therewith utilizing the catalyst of the present invention. In addition, a first cocatalyst containing an aluminum compound and a second cocatalyst which may be a stereoregulating hydrocarbyl alkoxysilane is employed.

The present catalyst system described herein offers advantages over the prior art catalysts, for example, in requiring no pre-conditioning or pre-polymerization while retaining relatively high surface area and pore volume, and producing under conventional polymerization conditions the desired polymeric product, with high activity, at high bulk density and high heptane insolubles.

DETAILED DESCRIPTION OF THE INVENTION

The catalyst of the present invention comprises an inorganic oxide support such as $Al_2O_3$, $SiO_2$, $Fe_2O_3$, $TiO_2$, MgO or mixtures thereof. In one preferred embodiment of the present invention, $SiO_2$ is used as the oxide support; most preferably, the surface of the support is treated to remove hydroxyl and/or silanol groups; the pretreating process results in a surface whose structural formula is defined in part by

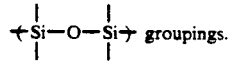

In one embodiment, this surface pretreatment is effected by calcining the support in an inert atmosphere, preferably at a temperature of at least 150° C. More preferably, the calcining is effected at a temperature range from about 150° C. to about 650° C. in an inert atmosphere, preferably a nitrogen-containing atmosphere.

More preferably, the removal of surface hydroxyl groups from the surface of the support is accomplished by chemically treating the support with alkyl disilazane or chlorosilanes as disclosed in U.S. Pat. No. 4,530,913 of Pullukat et al., for example. Of the alkyl disilazanes useful in this application, hexamethyl disilazane is preferred.

The pretreatment silica is preferably a high surface area, high pore volume material defined by a surface area of about 80 to about 300 square meters per gram, median particle size of about 20 to about 200 microns and a pore volume of about 0.6 to about 3.0 cc/gram as determined by Nitrogen Pore, BET Method.

The silica support employed in the catalyst are essentially pure but may contain other inorganic oxides such as alumina, titania, zirconia, magnesia, iron, and the like. In general, the silica support comprises at least 90% by weight pure silica, more preferably, at least 95%, and most preferably, the weight percent of pure silica is at least 99%.

The surface-modified silica is then interacted with a hydrocarbon soluble magnesium-containing compound. Such interaction may involve chemical reaction with the silanol groups on the silica support or chemisorption, but without limitation it is believed that the associative phenomenon is largely by way of physisorption aided by van der Waals forces, ligand association, hydrogen bonding and the like. Hydrocarbon soluble magnesium compounds that are suitable for this process include hydrocarbyloxymagnesium halides having the structural formula ROMgX, where $R=C_3$ to $C_{12}$ hydrocarbyl and X is a halogen, di- or hydrocarbyloxymagnesium and mixtures thereof. Preferably, the magnesium compounds are magnesium alkoxides, alkoxymagnesium halides and mixtures thereof. Especially preferred magnesium compounds include 2-methyl-1-pentyloxymagnesium chloride, pentyloxymagnesium chloride, di-2-ethylhexyloxymagnesium and mixtures thereof. Of these, the 2-methyl-1-pentyloxymagnesium chloride is most preferred. Other preferred materials are benzyloxymagnesium chloride and phenethyloxymagnesium chloride. The hydrocarbon solvent employed in this process include isobutane, pentane, hexane, heptane, decane, benzene, toluene and the like. Of these hydrocarbon solvents, heptane is the most preferred.

The hydrocarbon soluble magnesium containing compound is typically, and preferably provided as a relatively concentrated solution of 12-20 wt % Mg concentration selected to provide a viscous solution near saturation but without precipitation of the contained magnesium compound (i.e. further solvent could not be removed under ambient conditions without causing precipitation). The alkoxy magnesium compounds are commonly associated with about 0.5 to 1.5 moles/mole, preferably about 0.8 moles/mole of the related free alcohol (that is in the case of 2-methyl 1-pentoxy magnesium halide, 2-methyl 1-pentyl alcohol). It should also be recognized that the total free alcohol content could comprise 2-methyl 1-pentyl alcohol and another alcohol such as isopropanol wherein the concentration of 2-methyl-1-pentyl alcohol is defined above and the other alcohol is in a concentration from about 0 to 50% of the total alcohol content.

The amount of hydrocarbon soluble magnesium compound to be employed is related to the surface area of the support. Generally, a weight ratio of from about 20 to 80, preferably 35 to 70 (Mg compound/silica) of such compound (alone or in concert with an associated alcohol) will be sufficient to uniformly wet and upon drying form a regular spatial distribution of magnesium values in and upon the preferred high surface area, high pore volume silica support. The magnesium compound is generally utilized so to provide 0.01 to 10, preferably 0.5 to 4, weight percent of magnesium values for each 100 $m^2/g$ of surface area of the support. For convenience, the amount of magnesium compound is related by weight to the preferred high surface area (80-350 $m^2/g$ or greater), high pore volume support (above 0.6 ml/g), in a range of 0.05 to 12, preferably 0.5 to 8 weight percent of magnesium compound to support. Further observations of this catalyst system indicates that catalyst activity is equivalent for high and low loadings of the magnesium compound as are polymer physical properties. For example, relatively high magnesium loadings often result in broad particle size distribution.

The interaction between the support and the soluble magnesium compound usually occurs at a temperature of about 0° C. to about 150° C. More preferably, this interaction occurs at a temperature from about 50° C. to about 100° C. Most preferably, a temperature of about 60° C. to about 95° C. is employed, for a period of about 5 minutes to about 2 hours. More preferably, the interaction proceeds from about 45 minutes to about 1½ hours.

The next step in this catalyst preparation involves concentrating the solution of the hydrocarbon soluble magnesium compound such that a paste-like hydrocarbon soluble magnesium surface conforms to and forms a moist surface characterized by an essentially uniform spatial deposition of magnesium compound in and upon the support material. The viscous, gelatinous material is formed into a foraminous coating or discrete islands of deposited material by concentrating the alkoxymagnesium chloride solution using a controlled drying process to achieve essentially incipient wetness conditions. To those skilled in the art, this signifies that significant amounts of magnesium compound will be located upon and within the pores of the support; however, it does not suggest that no magnesium will be found on the surface of the support or that all pores will contain magnesium.

In practice, it can be observed that overdrying as described herein often results in a higher level of retained magnesium values on the support which however in this instance does not correlate with better performance in use. This phenomenon may be related to the selective removal of colonies of poorly bound at least partially solvated magnesium in the preferred drying protocol resulting in a colony population density and distribution more optimally related to measured performance criteria, i.e. the distances defined by and between, size or shape of reticula or domains of stacked magnesium values may more directly reflect the result of optimization in the drying phenomenon.

The drying step incorporated in the present process is to be performed at a controlled temperature at or below the boiling point of the hydrocarbon diluent, so as to effectively dry the solid to a point of incipient wetness. In addition, the evaporation of the solvent is aided by sweeping an inert gas such as nitrogen over the solid product. In another embodiment of the present invention, the controlled drying step is conducted such that the rate of solvent removal is from about 0.05 to about 5.0 g of solvent/g support/hr. More preferably, the rate of solvent removal is from about 0.1 to about 2.0 g of solvent/g support/hr.

More particularly, the drying in the preferred embodiments is conducted at temperatures below the boiling point of the associated alcohols) or azeotrope thereof so to avoid significant removal of the alcohol(s) under a nitrogen purge thereby maintaining the essentially monomeric form of the magnesium compound and/or suppressing the formation of oligomers thereof. The removal of solvent is performed under conditions that are not too fast or too hot. In certain embodiments, increased catalytic activity is obtained if the drying process is conducted at a temperature from about 40° to about 90° C. for 4 hours, whereas, long drying times of up to 8 hours at high temperatures have an adverse effect on the catalyst performance. The drying process is effectively carried out by employing a steady increase in heating rate up to the boiling point of the hydrocarbon solvent in the presence of inert gas sweep for times from about ½ to about 10 hrs. It should be recognized that the extent of drying will vary with the batch size. Preferably the drying is conducted from about 1 to about 6 hrs., and more preferably, the drying process is conducted at 2 to 6 hrs. For example, if heptane is used as the hydrocarbon solvent, the resultant slurry is dried at a temperature of about 60° C. to about 100° C. for a time of about 1.5 to about 2 hrs for a batch size of 1 lb of support. In another embodiment of the present invention, the end point of the drying step is determined by the amount of solvent removed or by the appearance of the resultant solid that is describable as being paste like. In yet another embodiment of the present invention, the resultant solid is the consequence of the incipient wetness conditions used hereinabove in drying the solid product. Preferably about 20 to 80 wt % of the initial quantity of the solvent is removed during the drying process, more preferably, about 30 to about 70 wt % of the solvent is removed during drying.

Typically, drying will be conducted under an atmosphere of and with a slow purge calculable to 200 ml/min. of nitrogen; in small volumes the granular coated support may be dried in a paddle stirred container with heat supplied from an external source.

It should be emphasized that the solid catalyst obtained in this present invention not be dried significantly beyond the point of incipient wetness otherwise reduced or no polymerization activity will result. Overdrying appears to result in the effective removal of the alcohol which results in oligomerization of the magnesium species and disruption in the distribution of the magnesium values on the surface of the inorganic carrier as well as, and represented by, a substantial decrease in the pore volume of the material. Also, underdrying will cause different deleterious results.

The drying process is effective in forming a regular spatial distribution of the magnesium compound onto the support in an amount calculable to about 1 to 5, preferably 1 to 3 monolayers thick. It is preferred that the drying process be conducted under precisely defined conditions in order to obtain from 2 to 3 monolayers (as so calculated) of magnesium onto the support material. In another embodiment of the present invention, the drying process is effectively carried out until about 35 to about 70% of the applied soluble hydrocarbon magnesium compound remains on the surface of the support. In another embodiment of the instant invention, the controlled drying step may remove about 0.1 up to 2% of the associated alcohol. In other words from 98 to 100% of the associated alcohol is present on the support.

Variation in drying conditions within the preferred range is believed without limitation to relate to the spatial distribution of the magnesium values, i.e. the size and shape of apertures in the network, or the spacing of and stacking in island structures formed of magnesium values, which may individually be of irregular shape. Control of drying parameters is more significant with higher catalyst loadings of magnesium values, at 5.0 mmol/g $SiO_2$ and higher, as the wet appearance of the catalyst tends to lead the operator to overdry at higher loadings. Correct drying is more naturally achieved in relation to perceived appearance at lower loading.

The solid catalyst obtained is then typically treated by contact with a modifying compound which chemically reacts with and removes the alcohol from the solid product. Such modifying compounds employed by the present invention include silicon halides, boron halides, aluminum halides, alkyl silicon halides and mixtures thereof. Of these, silicon halides, boron halides and aluminum halides are preferred. More preferably, the modifying compound is silicon tetrachloride, boron trichloride or aluminum trichloride. The contacting between the one or more modifying compounds and the solid usually occurs at a temperature of about 0° C. to about 100° C. over a period of about 30 minutes to about 2 hours. More preferably, this contact occurs at a temperature from about 50° C. to about 75° C. Where employed, the modifying compound will remove with the supernatant any excess (unassociated) alcohol introduced during the preparation by chemical reaction. An amount of modifying compound in excess of the alcohol level introduced is employed, generally 0.8 to 1.2 moles per mol of magnesium compound.

In another embodiment of this invention, the silica composition is not contacted with a modifying compound, such as silicon tetrachloride prior to the addition of titanium values. In either case, the composition obtained is thoroughly washed with an organic hydrocarbon solvent, preferably heptane, to essentially remove any unsupported residue that is not adheringly associated with the surface of the silica.

Additionally, the preparation of the catalyst of this invention involves reacting the resultant silica composition obtained above with an excess amount of one or more titanium-containing compounds having the formula $TiX_nY_{4-n}$, where X is Cl, Br or I; Y is F, R, OR or $NR_2$ wherein R is a $C_1$ to $C_{12}$ hydrocarbyl; and n is 0 or an integer from 1 to 4. In a preferred embodiment of the present invention, the titanium-containing compounds within the contemplation of this invention include titanium tetrachloride, titanium tetrabromide, methoxytitanium trichloride, ethoxytitanium trichloride, diethoxytitanium dichloride and the like.

Most preferably, n is an integer of 4. Thus, most preferably, the titanium compound is a titanium tetrahalide. Of these, titanium tetrachloride is particularly preferred.

The reaction between the silica composition and the titanium halide occurs at a temperature from about 0° C. to about 150° C. More preferably, the temperature of the reaction is between about 50° C. and about 120° C. Most preferably, the temperature of this reaction is between about 90° C. and 100° C.

The titanium compound and the silica composition obtained herein is reacted for a period of time to ensure sufficient adsorption of the titanium compound onto the surface of the silica composition. The time of this process is usually from about 30 minutes to about 4 hours. More preferably, the reaction occurs over a period of time from about 1 hour to about 3½ hours. Most preferably, the time of the reaction is between 1 and 2 hours. As demonstrated in the working examples, a long titanium halide reaction step at a high temperature can have an adverse effect on the performance of the resultant catalyst.

After this reaction is completed, the resultant supported catalyst is thoroughly washed with sufficient quantities of an organic hydrocarbon solvent to effectively remove any unsupported residue from the processes described herein. The preferred supported catalyst prepared by the method described previously herein is characterized as a particulate solid having a surface area of from 80 to 300 $m^2/gm$, preferably about 160 $m^2/gm$ and a pore volume of about 0.3 to 1.6, preferably about 0.8 cc/gm.

While not required, the catalyst may be prepared utilizing an internal electron donor such as dibutyl phthalate as is known in the art from e.g. U.S. Pat. No. 4,473,660. Other modified preparative techniques may also be used, such as the initial reaction of the magnesium treated support component described herein with a titanium alkoxide such as titanium tetra-n-butoxide, titanium cresylate, titanium 2-ethylhexoxide, titanium tetra (trimethyl silyl) methoxide or titanium isopropoxide or the like, followed by a retreatment, followed by a washstep, and subsequent reaction with titanium tetrachloride. Reference is had for a more complete description in U.S. Pat. No. 4,950,631 incorporated herein by reference. Dual site catalysts such as those disclosed in U.S. Pat. No. 5,051,388 are also contemplated.

The silicon ester treatments may involve silicon tetrachloride alone, trichlorosilane, a mixture thereof or their use in sequence as disclosed in U.S. Pat. No. 5,034,365 incorporated herein by reference.

It should be understood that the drying process contemplated herein may be modified in practice to reflect the utilization of additional components or chemical identity of the titanium reactant(s), and interrelated to the presence or amount of alcohol associated with the hydrocarbon solvent.

It should be appreciated that all the treatment steps described herein involve the reaction between a solid silica and a liquid. That is, the compounds that are contacted with the silica are liquids at ambient conditions or are essentially soluble in an inert hydrocarbon solvent. As a consequence, no ballmilling or other solid mixing otherwise usually used is required. This expensive and difficult operation, common to the formation of polymerization catalysts of the prior art, is eliminated. Those skilled in the art are quite aware that the hydrocarbon solvent employed in this invention can be removed by conventional means such as decantation, filtration or evaporation.

Further observation regarding the above described formation steps include the fact that the physical structure, i.e., morphology, bulk density, etc., of the polymer produced from this catalyst emulates that of the support on which the reaction originally occurred. The fact that there is an absence of any halogen in the support aids in keeping the halogen content of polymer produced at a minimum. Also, the relatively low concentrations of titanium and magnesium on the silica tends to keep the concentration of titanium and magnesium residue in the polymer formed at similarly low levels.

Another aspect of the present invention involves the use of the catalyst of the present invention in the polymerization of olefins, like ethylene, to produce homopolymers and copolymers under conditions which are normally employed for these polymerization processes.

The said catalyst is extremely useful for the polymerization of alpha-olefins when used in conjunction with a cocatalyst. The first cocatalysts that can be employed in the propylene polymerization process of the present invention involves an aluminum-containing compound. The aluminum compound is preferably an alkylaluminum, an alkylaluminum halide or mixtures thereof. More preferably, the cocatalyst is an aluminum alkyl. Of these compounds, triethylaluminum is particularly preferred.

A second cocatalyst, which acts as a stereoregulating agent, is also typically employed in the propylene polymerization process of the present invention. This second cocatalyst preferably contains at least one silane compound. Preferably, the silane compound is a hydrocarbyl alkoxysilane. Preferred hydrocarbyl alkoxysilanes that are suitable in the present invention include hydrocarbyl trialkoxysilanes, dihydrocarbyl dialkoxysilanes and trihydrocarbyl alkoxysilanes. Of these compounds, those preferred involve a hydrocarbyl having the meanings phenyl and $C_1$-$C_6$ alkyl and a $C_1$-$C_{10}$ trialkyl. Most preferred compounds include hexyltrimethoxysilane, amyltriethoxysilane, diisopropyl dimethoxysilane, isobutyl isopropyl dimethoxysilane, cyclohexylmethyl dimethoxysilane, dicyclopentyl dimethoxysilane and isobutyltrimethoxysilane.

The usual olefin (co)polymerization conditions involve a reaction temperature from about 35° C. to about 120° C. More preferably, the temperature of this reaction is from about 50° C. to about 80° C. The pressure employed in the olefin (co)polymerization reaction is from about 200 psig to about 600 psig, more preferably, from about 400 psig to about 550 psig.

The following examples are given to illustrate the scope of the invention.

EXAMPLE 1

Catalyst Preparation

A catalyst was prepared by charging 5.0 gms of Davison 948-HMDS silica with a hexamethyl disilazane loading of 2.5 mmol/g $SiO_2$ to a 250 ml, 4-neck flask equipped with a paddle stirrer, nitrogen purge, siphon tube, and an inlet line for heptane washings. Heating was conducted by using an electrical heater and controlled by a Thermo Watch L7-800 Temperature Controller via a sensor on a thermometer.

The silica was heated to 150° C. under a 100-150 ml/min nitrogen purge while continuously stirring at 90 rpm for 1 hour. Thereafter, the flask was cooled down to room temperature by removing the heating mantle and turning off the stirrer while maintaining a purge of nitrogen. Once cooled, 7.5 mmol/g $SiO_2$ of 2-methylpentoxymagnesium chloride in heptane (0.65 molar or 14 wt. %) comprising 0.48 mol of associated 2-methyl pentanol was added to the silica and reacted for 30 minutes with a continuous purge of nitrogen and stirring. Thereafter, the temperature was increased to 100° C. for approximately 1.5-2 hours. This drying step corresponded to concentrating the alkoxymagnesium chloride solution to a 50 weight % concentration. Following this step, the flask and pre-catalyst were cooled down to room temperature without stirring.

Approximately, 10 ml of pure grade heptane (B.P.=98.4° C.) was introduced to the reaction flask, stirring initiated, and 37.5 mmol of silicone tetrachloride was added by means of a syringe to the flask. The components were reacted at room temperature for 30 minutes. A reaction of these compounds was observed by a 2-3 degree increase of the solutions' temperature during this period. Also during this time period, the solution began to thicken and form lumps. The lumps that appeared broke up after 10 minutes and became dense solid particulate matter suspended in the solvent. Thereafter, the temperature was increased to 45°-50° C. and maintained at this temperature range for 30 minutes. The stirring and heating was then stopped to allow the solid particulate matter to settle. Once the particulate matter had settled, the supernatant (comprising silicon tetrachloride/excess alcohol residues) was siphoned off. Seventy ml of fresh pure grade heptane was then added and stirred for 1 minute without further heating. The solid was again allowed to settle and the supernatant siphoned off. This washing step was repeated two to three times. Liquid titanium tetracresylate was added as a 50 vol. % solution (0.6 mmol/g $SiO_2$) to the washed solid and allowed to react with the solid for 1-5 minutes at room temperature. Thereafter, 18 mmol/g $SiO_2$ of titanium tetrachloride was added (neat), the temperature was then increased to 100° C. and the components were allowed to react for 1 hour. The dense particulate product of this reaction was washed 5-6 times with heptane, as described in the previous washing step. The recovered support contained 6.67 mg/g support of magnesium (or expressed as applied magnesium compound) and exhibited a surface area of 240 $m^2$/g (BET) and a pore volume of 0.8 ml/g (BET).

Catalysts so prepared were effective as propylene polymerization catalysts.

EXAMPLE 2

Catalyst Preparation

A catalyst was prepared in accordance with the procedure of Example 1. However, in the drying step, the material was overdried which corresponded to concentrating the alkoxymagnesium chloride solution to about 80 weight % concentration. Specifically, whereas the concentration of Mg of catalyst of Example 1 was 6.67 weight % based upon silica, the concentration of Mg in the present example was 7.47 weight %.

EXAMPLE 3

Catalyst Preparation

A catalyst was prepared in accordance with the procedure of Example 1 except that the silica was Crosfield HMDS EP-10 and no titanium tetracresylate was added. This example illustrates that the cresylate is not essential to produce a high activity, high % heptane insoluble polypropylene catalyst.

EXAMPLE 4

Propylene Polymerization Utilizing Catalyst of Examples 1-2

Liquid propylene was separately reacted with each of the catalysts of Examples 1 to 3. In addition to 40 mg of the catalyst of each of Examples 1 to 3, two co-catalysts were utilized. These two co-catalysts were triethylaluminum and isobutyltrimethoxysilane (IBTMS). The amounts of the triethylaluminum and IBTMS employed were such that the molar ratio of aluminum to titanium to IBTMS was 40:1:8, respectively. Each propylene polymerization reaction was conducted at a pressure of 460 psig and a temperature of 70° C. In each of these runs, 4.5 mmol of hydrogen was used to control the molecular weight of the propylene homopolymer product.

The results of these polymerizations are summarized in Table 1. The polymerization reaction time was one hour. It may be noted that if the solid product is overdried then the resultant catalyst has poor activity and the pore volume is affected negatively.

TABLE 1

| Catalyst of Example No. | Wt. % Ti | Wt. % Mg | Degree of ROMgCl Conc. (Calc) ± 10% | Activity g/g hr | B.D.[a] #/ft$^3$ | % HI[b] | Surface Area[c] M$^2$/gm | Pore Volume[c] ml/g |
|---|---|---|---|---|---|---|---|---|
| 1 | 3.32 | 6.67 | 50% | 9500 | 20 | 97.2 | 240 | .8 |
| 2 | 3.97 | 7.47 | 80% | 500 | 29 | — | 240 | .3 |
| 3 | 2.25 | 3.28 | 57% | 9000 | 20.4 | 98.1 | — | — |

[a]B.D. - bulk density
[b]H.I. - Heptane Insolubles
[c]represents BET Measurements

EXAMPLES 5-8

Effect of Silica Supports

In these examples, a variety of different silica supports having a wide range of pore volume and surface areas were investigated. The catalyst were prepared in accordance with Example 1; however, different silica supports were used. Propylene polymerization was carried out on each of these examples in accordance with Example 4.

The results are summarized in Table 2 which includes the results obtained for the catalyst of Example 1. The results indicate the propylene polymerization proceeds effectively on a variety of silica supports having a wide range of pore volume and surface area.

TABLE 2

| Catalyst of Example No. | Silica Type | Wt. % Mg | Wt. % Ti | Degree of ROMgCl Conc. (Calc) ± 10% | Mg/g SiO$_2$ | mmol SiCl$_4$/g SiO$_2$ | Activity g/g hr. | BD #/ft$^3$ | % HI's |
|---|---|---|---|---|---|---|---|---|---|
| 1 | Davison - 948 HMDS SA-240 m$^2$/g PV-1.6 ml/g | 6.67 | 3.32 | 50% | 7.5 | 7.5 | 9,500 | 20 | 97.2 |
| 5 | PolyPor[1]- HMDS SA-350 m$^2$/g PV-2.5 ml/g | 1.50 | 3.56 | 50% | 3.0 | 3.0 | 10,200 | 22.4 | 98.3 |
| 6 | Akzo HSA SiO$_2$ SA-800 m$^2$/g PV-3.4 ml/g | 7.16 | 7.36 | 50% | 7.5 | 7.5 | 12,750 | 22.5 | 95.1 |
| 7 | PolyPor[1] HMDS SA-350 m$^2$/g PV-2.5 ml/g | 7.43 | 3.98 | 50% | 7.5 | 7.5 | 11,300 | 21.8 | 96.3 |
| 8 | EP-17 Crosfield SA-320 PV-1.7 | 5.00 | 3.30 | 50% | 3.0 | 3.0 | 10,000 | 26.2 | 97.2 |

[1]PolyPor catalyst supports are prepared as described in U.S. Pat. No. 4,053,565 and are preferred in aspects of the present invention.

EXAMPLES 9-11

Effect of the Solubility of Alkoxymagnesium Chloride Compound

In these examples, the usefulness of different alkoxymagnesium chloride compounds was studied. The catalyst was prepared in accordance with Example 1 except for varying the alkoxymagnesium chloride compound. All catalysts were dried to 50 wt. % alkoxymagnesium compound (calc ±10%).

The results of these examples are summarized in Table 3 which includes the results obtained for the catalysts in Example 1. Propylene polymerization was conducted in accordance with Example 4. The results indicate the other alkoxymagnesium chloride compounds besides 2-methylpentyloxymagnesium chloride are equally applicable for propylene polymerization. The resultant catalyst in Example 11 has a lower activity compared to the other catalysts.

TABLE 3

| Catalyst of Example No. | Mg Source | Silica Type | mmol SiCl$_4$/g SiO$_2$ | mmol SiCl$_4$/g SiO$_2$ | Wt. % Mg | Wt. % Ti | Activity g/g hr. | BD #/ft$^3$ | % HI's |
|---|---|---|---|---|---|---|---|---|---|
| 1 | 2-methylpentlyoxy-MgCl | 948-HMDS | 7.5 | 7.5 | 6.67 | 3.32 | 10,000 | 25.4 | 97.6 |
| 9 | 2-ethylhexyloxy-MgCl | 948-HMDS | 7.5 | 7.5 | 5.0 | 2.4 | 11,000 | 23.6 | 97.3 |
| 10 | benzyloxide-MgCl | EP-10, HMDS | 3.0 | 3.0 | 3.63 | 6.05 | 9,000 | 10.0 | 85.0 |
| 11 | phenethyloxy-MgCl | EP-10, HMDS | 3.0 | 3.0 | 3.86 | 3.72 | 500 | — | — |

EXAMPLES 12-15

Effect of Adding a Second Modifying Compound

In these examples, the catalysts were prepared in accordance with Example 1 (50% concentration) except that instead of just reacting SiCl$_4$ with the deposited ROMgCl a sequential addition of 85 mol % SiCl$_4$ and 15 mol % HSiCl$_3$ was employed. In Example 15, the sequential addition of the modifying compounds was carried out; however, no titanium tetracresylate was added in this instance.

The results of these examples are summarized in Table 4. These examples compare catalysts containing SiCl$_4$ to SiCl$_4$-HSiCl$_3$ and SiCl$_4$-HSiCl$_3$ without the titanium ester compound. In all instances, the catalysts prepared had good catalytic activity for propylene polymerization and the resultant polymer had excellent physical characteristics.

TABLE 4

| Catalyst of Example No. | Modifying Agent | Silica Type | mmol Ti(OR)$_4$/g SiO$_2$ | Wt. % Mg | Wt. % Ti | Activity g/g hr. | B.D. #/ft$^3$ | % HI's |
|---|---|---|---|---|---|---|---|---|
| 12 | SiCl$_4$ | 948-HMDS | 0.6 | 3.58 | 3.42 | 10,000 | 25.4 | 97.4 |
| 13 | SiCl$_4$ & HSiCl$_3$ | 948-HMDS | 0.4 | 4.52 | 5.86 | 15,200 | 19.0 | 94.6 |
| 14 | SiCl$_4$ & HSiCl$_3$ | 948-HMDS | 0.4 | 3.62 | 5.26 | 10,700 | 24.7 | 94.9 |
| 15 | SiCl$_4$ & HSiCl$_3$ | 948-HMDS | — | 4.51 | 3.61 | 10,000 | 23.5 | 98.2 |

EXAMPLE 16

The following example in Table 5 reports the surface area and pore volume data of the catalyst during different preparation stages. The data illustrates that overdrying results in a decrease in surface area and particularly pore volume to about 60-80 m$^2$/gm and 0.3 cc/gm, respectively. Retained surface area and particularly pore volume is significant to the achievement of a highly active polymerization catalyst.

TABLE 5

| | Surface Area (m$^2$/gm) | Pore Volume (cc/gm) |
|---|---|---|
| SiO$_2$ | 220 | 1.60 |
| Alkyoxide magnesium caloride addition and controlled drying | 120 | 0.60 |
| Overdrying | 60-90 | 0.30 |
| Addition of SiCl$_4$ and wash with solvent | 140 | 0.80 |
| Addition of Titanium Compound | 160 | 0.80 |

EXAMPLES 17-23

Effect of Drying and Mg Loading on a 1-3 lb. Catalyst Scale Up

These examples illustrate the importance of obtaining a proper deposition of alkoxymagnesium chloride onto the silica support, utilizing larger scale equipment.

The catalysts were prepared in accordance with Example 1: however, two different loadings of alkoxymagnesium chloride were used to illustrate the importance of the drying step. Examples 17-19 represent a 5 mmol Mg/g SiO$_2$ loading, while in Examples 20-23 the loading was 7 mmol Mg/g SiO$_2$.

The results of these examples are summarized in Table 6. The results in Table 6 show that the degree of concentrating the 2-methylpentyloxymagnesium chloride to a level of 44% or greater enhances the performance of the resulting catalyst. If the alkoxymagnesium chloride compound is not concentrated enough poor performance, i.e. low bulk density and low catalyst activity is a result. Also, utilizing a higher concentration level of alkoxymagnesium chloride (>52%) resulted in this case in lower but acceptable activities.

EXAMPLES 24-30

Effect of Drying Temperature and Time During ROMgCl Deposition on Catalytic Activity The following examples in Table 7 illustrate the importance of the drying temperature and time during ROMgCl deposition on the activity of the catalyst. The catalysts in these examples were prepared in accordance with Example 1; except for the different temperatures and times used in the drying process. The result indicates that long ROMgCl drying time at a high temperature have adverse effects on the activity of the catalysts.

TABLE 7

| Catalyst of Example No. | Drying Temp. °C. | Drying Time hr. | Activity g/g hr | % HI | B.D.$_3$ #/ft |
|---|---|---|---|---|---|
| 24 | 87 | 2 | 5200 | 97.6 | 23.7 |
| 25 | 90 | 4 | 5300 | — | 25.2 |
| 26* | 100 | 3.75 | 3600 | 92.0 | 26.2 |
| 27 | 125 | 2 | 2170 | 89.3 | 17.5 |
| 28* | 130 | 2 | 1857 | 90.7 | — |
| 29 | 40-90° C. | 2 | 5057 | 98.2 | 22.2 |
| 30* | 90° C. | 8 | 2000 | 91.2 | — |

*represents reduced loading (i.e. 50% of normal amount used of ROMgCl, SiCl$_4$, Ti(OR)$_4$, and TiCl$_4$).

EXAMPLES 31-37

Effect of Temperature and Time During the TiCl$_4$ Reaction Step on Catalyst Activity The following examples of Table 8 illustrate the importance of the temperature and time employed during the TiCl$_4$ reaction step. The catalysts in these examples were prepared in accordance with Example 1; except for the varied reaction temperature and time of the TiCl$_4$ reaction process. The data indicates that a long TiCl$_4$ reaction step at a high temperature has an adverse effect of the performance of the catalyst.

TABLE 8

| Catalyst of Example | TiCl$_4$ Rxn Temp. °C. | Time hrs. | Activity g/g hr. | % HI's | B.D. #/ft$^2$ |
|---|---|---|---|---|---|
| 31 | 37-95 | 2 | 5200 | 97.6 | 23.7 |
| 32 | 23-99 | 4 | 5300 | — | 25.8 |
| 33* | 30-91 | 3.75 | 3600 | 92.0 | 26.2 |

TABLE 6

| Catalyst of Example No. | Degree of ROMgCl Conc. (Calc; + up to 10%) | mmol Mg/g SiO$_2$ | Wt. % Mg | Wt. % Ti | Activity g/g hr. | B.D. #/ft$^3$ | % HI's |
|---|---|---|---|---|---|---|---|
| 17 | 27 | 5.0 | 3.75 | 2.88 | 4140 | 19.4 | 96.1 |
| 18 | 33 | 5.0 | 6.41 | 2.81 | 6240 | 22.5 | 98.1 |
| 19 | 44 | 5.0 | 0.08 | 2.98 | 7640 | 24.7 | 96.5 |
| 20 | 33 | 7.0 | 8.36 | 2.73 | 3314 | 7.5 | 95.6 |
| 21 | 44 | 7.0 | 7.3 | 2.73 | 5540 | 27.5 | 97.3 |
| 22 | 45 | 7.0 | 7.32 | 2.39 | 3940 | 27.5 | 96.4 |
| 23 | 52 | 7.0 | 7.02 | 2.14 | 4623 | 29.2 | 97.7 |

TABLE 8-continued

| Catalyst of Example | TiCl4 Rxn Temp. °C. | Time hrs. | Activity g/g hr. | % HI's | B.D. #/ft² |
|---|---|---|---|---|---|
| 34 | 18-99 | 2 | 2170 | 89.3 | 17.5 |
| 35* | 30-100 | 2 | 1857 | 90.7 | — |
| 36 | 115 | 2 | 5371 | 98.0 | 27.5 |
| 37* | 90 | 4 | 5143 | 98.5 | 26.8 |

*represents reducing loading (i.e. 50% of normal amount used of ROMgCl, SiCl4, Ti(OR)4, and TiCl4.)

EXAMPLES 38-41

Effect of Mg Loading

The following examples in Table 9 investigates the effects of Mg loading has on the activity of the catalyst and on the physical properties of the resultant polymeric product. The catalysts in these examples were prepared in accordance with Example 1; however, different loadings of alkoxymagnesium chloride were used. In these examples, loadings of 1.1 pound mmole of magnesium per pound of silica up to 7.5 pound mmole were investigated. The data in Table 9 shows that the catalytic activity is equivalent for high and low Mg loadings as are polymer physical properties. The polymer particle size distribution was broad at loadings above 1.1 pound mmole. Furthermore, the data illustrates that low catalyst bulk density at higher Mg loading reduces the yield of catalyst. In order to obtain good polymer bulk density and particle size, the catalyst should be uniformly distributed in the pores of the support material. Measurement of catalyst bulk density shows that as the loading of Mg increases the bulk density decreases. Without wishing to be bound by any mechanism, this suggests that the catalyst is formed on the outer surface of the support or separate from the support material.

TABLE 9

| Catalyst of Example No. | ROMgCl loading | SiO₂ % | Mg % | Ti % | Mg SiO₂ | Activity g/g hr. | % HI | B.D. #/ft³ |
|---|---|---|---|---|---|---|---|---|
| 38 | 1.1 | 71 | 2.3 | 2.7 | 0.032 | 7280 | 98.7 | 25.2 |
| 39 | 3.5 | 56 | 4.8 | 2.9 | 0.086 | 7360 | 97.5 | 25.2 |
| 40 | 5.0 | 53 | 6.0 | 3.1 | 0.11 | 7224 | 97.3 | 21.3 |
| 41 | 7.5 | 46 | 7.5 | 3.0 | 0.16 | 7080 | 97.9 | 20.9 |

What is claimed is:

1. In a method of preparing a supported catalyst component for the polymerization of at least one alpha olefin, including the steps of effecting interaction between a hydrocarbon soluble magnesium compound solubilized in a hydrocarbon solvent with an inorganic catalyst support including applying said magnesium compound in said solvent to said support, and drying the so-treated support to concentrate the solution, the improvement which comprises effecting such drying so to remove a selected proportion of said solvent and effect the formation of a regular spatial distribution of magnesium values in and upon the effective surface area of said inorganic support, wherein the magnesium value upon the completion of the drying step is from about 0.1 to about 12 weight percent of magnesium to inorganic support.

2. The method of claim 1 wherein the solvent is removed at a rate of about 0.05 to about 5.0 g solvent/g support/hr.

3. The method of claim 2 wherein the solvent is removed at a rate of about 0.1 to about 2.0 g of solvent/g support/hr.

4. The method of claim 1 wherein n said drying step removes from about 20 to about 80 wt % of the initial quantity of solvent.

5. The method of claim 4 wherein said drying step removes about 30 to about 70 wt % of the initial quantity of solvent.

6. The method of claim 1 wherein the inorganic support is silica.

7. The method of claim 1 wherein the hydrocarbon soluble magnesium compound is an alkoxymagnesium halide.

8. The method of claim 7 wherein the solution of alkoxymagnesium halide in said hydrocarbon solvent is near or at saturation.

9. The method of claim 1 wherein said solvent is heptane.

10. The method of claim 9 wherein said alkoxymagnesium halide is an alkoxymagnesium chloride.

11. The method of claim 9 wherein said alkoxymagnesium halide is 2-methyl 1-pentyloxy magnesium chloride.

12. The method of claim 9 wherein said alkoxymagnesium halide is associated with 0.5 to 1.5 moles/mole of an alcohol corresponding to the alkyl moiety of the alkoxy group.

13. The method of claim 12 wherein the drying process is effective in removing from about 0.1 to about 2% of the associated alcohol.

14. The method of claim 13 wherein the drying process effective in removing about 0.5% of the associated alcohol.

15. A particulate, granular catalyst component useful for preparing a catalyst for the polymerization of alpha olefins to stereospecific polymers of high bulk density and high heptane insolubles with high yield and activity comprising a high surface area/high pore volume silica support impregnated with an alkoxymagnesium halide regularly microdistributed thereon in an amount sufficient to provide 0.1 to 10 weight percent of magnesium in and upon said support, and the treated surface of the support being essentially uniformly wetted with solvent after removal of a portion of said solvent 16. The catalyst component of claim 15 wherein the support contains up to 80% solvent.

17. The catalyst component of claim 16 wherein the support from 30 to 70% solvent.

18. The catalyst component of claim 17 wherein from 98 to 100% of the alcohol content associated with the alkoxymagnesium halide compound is present on the support.

19. The catalyst component of claim 15 wherein the dried silica has a surface area of about 80 to 400 m²/g, more preferably 100 to 350 and a pore volume of about 0.3 to 1.5, more preferably 0.6 to 1.0 ml/g.

20. The catalyst component of claim 15 further reacted with at least one or more titanium compound having the structural formula $TiX_nY_{4-n}$ where X is Cl, Br, I; Y=F, R, OR or $NR_2$ wherein R=$C_1$ to $C_{12}$ hydrocarbyl; n is 0 or an integer from 1 to 4.

21. The catalyst component of claim 20 wherein said titanium compound is a titanium tetraalkoxide.

22. The catalyst component of claim 20 wherein said titanium compound is a titanium tetraalkoxide.

23. A catalyst component for the polymerization of propylene and alpha olefin monomers copolymerizable therewith comprising an inorganic support of high surface area and pore volume treated with an alkoxy magnesium halide compound and a titanium halide, wherein the alkoxymagnesium halide values are distributed in and upon the surface of said inorganic support responsive to the controlled removal of solvent for said magnesium compound to provide a residual regularly distributed population of magnesium values of from about 0.05 to about 12 weight percent of magnesium to silica.

24. The catalyst component of claim 15 wherein said alkoxymagnesium halide is associated with 0.5 to 1.5 moles/mole of an alcohol corresponding to the alkyl moiety of the alkoxy group.

* * * * *